United States Patent [19]

Chaney et al.

[11] Patent Number: 5,719,401
[45] Date of Patent: Feb. 17, 1998

[54] POSITION-SENSITIVE ELECTROMAGNETIC RADIATION DETECTORS

[75] Inventors: Roy C. Chaney, Plano; Hilton D. Hammack, Allan, both of Tex.

[73] Assignee: Board Of Regents, The University Of Texas System, Austin, Tex.

[21] Appl. No.: 732,970

[22] Filed: Oct. 16, 1996

[51] Int. Cl.[6] ............................................. G01J 1/24
[52] U.S. Cl. ............................ 250/370.1; 250/214 VT; 378/98.8
[58] Field of Search ........................... 250/214 VT, 580, 250/370.08, 370.13; 378/98.8

[56] References Cited

U.S. PATENT DOCUMENTS

| | | | |
|---|---|---|---|
| 3,755,704 | 8/1973 | Spindt et al. | 313/309 |
| 3,789,741 | 2/1974 | Hallberg | 91/488 |
| 3,812,559 | 5/1974 | Spindt et al. | 29/25.18 |
| 4,471,378 | 9/1984 | Ng | 358/113 |
| 4,639,599 | 1/1987 | Ichihara | 260/363 S |
| 4,980,552 | 12/1990 | Cho et al. | 350/363.03 |
| 5,103,098 | 4/1992 | Fenyves | 250/368 |
| 5,245,191 | 9/1993 | Barber et al. | 250/363.04 |
| 5,281,821 | 1/1994 | Antich et al. | 250/368 |
| 5,334,839 | 8/1994 | Anderson et al. | 250/368 |
| 5,374,824 | 12/1994 | Chaney et al. | 250/363.02 |
| 5,374,826 | 12/1994 | LaRue et al. | 250/397 |
| 5,391,882 | 2/1995 | Rhiger | 250/370.13 |

OTHER PUBLICATIONS

"A Revolution In Medical Imaging" *Business Week*; Jul. 7, 1997; p. 134.
Butler, et al., "$Cd_{1-x}Zn_xTe$ Gamma Ray Detectors", *Transactions on Nuclear Science*, vol. 39(4):605–609, 1992.
Chaney et al., "Gamma Ray Imaging Using A Cadmium Zinc Telluride Crystal and Micro Channel Plates"; conference record of the 1996 *IEEE Nuclear Science Symposium and Medical Imaging Conference*.

Derbyshire, "Beyond AMLCDs: Field emission displays?", *Solid State Technology*, pp. 55–65, Nov., 1994.

(List continued on next page.)

*Primary Examiner*—Don Wong
*Attorney, Agent, or Firm*—Arnold, White & Durkee

[57] ABSTRACT

A position-sensitive electromagnetic radiation detector for measuring the position and energy of high energy electromagnetic radiation emitted from a high energy electromagnetic radiation source. The detector may also be used for measuring the position and energy of high energy electromagnetic radiation emitted from a radioactive material administered to a patient in a medical diagnostic imaging system to produce an image of the patient. The electromagnetic radiation includes X-ray and Gamma ray radiation. The electromagnetic radiation detector includes the combination of a cadmium zinc telluride (CdZnTe) crystal to absorb the incident radiation (incident photons) and directly convert the incident photons into electrons and a micro-channel plate (MCP) to collect and multiply these electrons. The CdZnTe crystal and MCP may be further combined with activation means activating the CdZnTe crystal to facilitate the liberation of electrons from the crystal, readout means coupled to MCP for reading the current produced by the electrons multiplied by the MCP, and means for accelerating electrons so produced and multiplied from one component of the invention toward the other. The transfer of electrons from one component of the invention to the other may also be facilitated by enclosing the electromagnetic radiation detector in a vacuum envelop. The present invention provides a better position and energy resolution detector that can be coupled with a larger range of fast and simple readout devices. This improves significantly the diagnostic power of the presently used Positron Emission Tomography (PET) and Single Photon Emission Computed Tomography (SPECT) systems, and greatly extends the field of their application both in medical diagnosis and research.

57 Claims, 1 Drawing Sheet

OTHER PUBLICATIONS

Doty et al., "Pixellated CdZnTe detector arrays," *Nucl. Inst. and Methods*, A353:356–360, 1994.

Gordon et al. "Work Function and Photoemnission Studies of Cesium–Coated CdTe(100)", vol. 49(7), 4898–4901, Feb. 1994.

Hudson, et al., "Measurement of the energy resolution of a scintillating fiber detector," *SPIE* 2281:65–70, 1994.

Lumb and Nousek, "Energy response of astronomical CCD X–ray detectors", *SPIE* 1736:138138–148, 1992.

Nelson, et al., "Testing of a Scintillating Fiber PET System," *SPIE* 2007:132–136, 1993.

Sorenson and Phelps, Physics In Nuclear Medicine, pp. 72–81, 298–317, 428–443.

Williams & Sobottka, "Progress toward a 92 mm diameter MCP phototube with helical delay line readout," *SPIE*, 2278:248–256, 1994.

Computerized Search dated Aug. 23, 1995.

DIALOG Search dated Aug. 23, 1995.

DIALOG Search dated Aug. 24, 1995.

DIALOG Search dated Aug. 27, 1995.

POSITION-SENSITIVE ELECTROMAGNETIC RADIATION DETECTORS

BACKGROUND OF THE INVENTION

1. Field of the Invention

This invention relates to a device and a method for accurately measuring the position and energy of high energy electromagnetic radiation emitted from high energy electromagnetic radiation source, such source may be radioactive material administered to a patient in a medical diagnostic imaging system to produce an image of the patient.

2. Description of Related Art

Recent advances in diagnostic imaging, such as magnetic resonance imaging (MRI), computerized tomography (CT), single photon emission computed tomography (SPECT), and positron emission tomography (PET) have made a significant impact in cardiology, neurology, oncology, and radiology. Although these diagnostic methods employ different techniques and yield different types of anatomic and functional information, this information is often complementary in the diagnostic process.

High energy X-rays and gamma rays (energy greater than 10 keV) have found extensive use in these medical imaging systems. Each of these medical imaging systems strongly depend upon the accurate measurement of the position and energy of high energy incident photons. The quality of the reconstructed image within these systems is critically dependent upon the ability of the electromagnetic radiation detectors to provide the spatial location and energy of the detected photon.

Current gamma detectors for these systems have consisted of a converter that absorbs the gamma photon and generates visible light photons for detection by a photomultiplier tube. Since the efficiency for absorbing gamma radiation is proportional to the fourth power of the atomic charge of the constituent atoms, the converters are usually constructed from heavy element crystals. Scintillating crystals such as sodium iodide and barium germinate have been used extensively in SPECT and PET systems. The dispersion of the visible light within these crystals has limited their spatial resolution to the order of several millimeters. The multiple conversion process of gamma photon to visible photons and visible photon to electron current (within the photomultiplier tube) has limited the energy resolution to the order of 20% of the incident gamma energy.

Other gamma detectors have used plastic scintillating fibers for the converter (Nelson et al., 1993). Since the visible photons were channeled along the plastic fibers to the photomultiplier tube the spatial resolution was significantly greater (~1.5 mm) than that of the crystals. This technology resulted in two patents award to The University of Texas System (Antich et al., 1994; Chaney et al., 1994). There are, however, two problems with using plastic fibers as the converter:

First, the energy of the original gamma is converted by a Compton process into electron energy which is deposited in the plastic and into another gamma that generally exits the plastic. The fraction of energy going into the second gamma and exiting the plastic is statistical in nature and cannot be predicted. This means that the energy of the incident gamma cannot be obtained from the light output of the plastic scintillator.

Second, since plastic is constructed from light element atoms (Carbon and Hydrogen), a much larger thickness of material is required for an equivalent gamma stopping efficiency to that of the heavy element crystals.

Semiconductor crystals (primarily silicon and germanium) have been used extensively for the detection of lower energy X-rays (1 to 10 keV) (Lumb & Nousek, 1992). They are constructed in a manner similar to the charge coupled device (CCD) of a television camera, except that they are made sensitive to X-rays instead of visible light. In this device, the X-rays create many free electrons that are drifted by an electric field to a pixel detecting device. The resolution of these devices is much better than 1 mm since the electrons do not disperse in all directions (as in the case of the visible light), but move in the direction of the electric field. Since the photon is directly converted into a detectable electrical current, these devices also have a much better energy resolution. Unfortunately, these devices are constructed using light element materials and cannot be produced with a thickness large enough to efficiently stop gamma's of energy greater than 10 keV. One solution to this problem is to place a scintillating phosphor converter on the face of these devices to convert the gamma photons into visible photons, but in doing so one loses much of the energy and spatial resolution.

Recently, semiconductor devices for detecting high energy photons have been fabricated using cadmium zinc telluride (CdZnTe). That has opened up the possibility for a detector position resolution better than 1 mm and a significantly improved energy resolution (Butler et al., 1992). Since the elements in this material (mainly cadmium and tellurium) are much heavier than silicon and germanium, these devices are much better absorbers of high energy photons. Systems using these semiconductors have the same advantage that silicon detectors have over scintillating converters, that the light is directly converted into electrons that are directed by an electric field to be detected at the surface.

Various activation modes have been developed recently to draw electrons from the surface into the vacuum, such as negative affinity device techniques (Gordon et al., 1994), wherein the CdTe crystal surface is activated by making it a negative affinity device. Gordon et al. (1994) describes the activation of surface of CdTe for an infrared detector.

Devices have been constructed using CdZnTe crystals coupled to preamplifiers and charge coupled devices (Doty et al., 1994). These devices have been demonstrated to have excellent energy and spatial resolution. There are, however, two challenges to this detector system for use in SPECT and PET:

First, the CdZnTe produces about 1 electron of current per 5 eV of incident gamma radiation. This corresponds to a charge of 4 to 15 femto-coulombs for the incident gamma's used in SPECT and PET. In emission computed tomography, each of the incident gamma's must be detected individually in order to obtain their energy. Accurate determination of this energy is critical to discriminate against photons that are scattered within the body. In other words, contrary to the typical operation of a CCD, where the charge from many photons is accumulated before a given pixel is read, the charge on a pixel must be read at a frequency great enough to prevent two gamma events from being recorded in the same pixel element. This fact necessitates the design of a high gain preamplifier into each pixel element of the CCD readout system in order to get a detectable current from a single gamma conversion. The readout system is also complicated by the fact that the detector must be read out frequently to prevent the pile up of charge in a pixel element, since this pile up precludes the energy resolution necessary for discrimination. To eliminate the dead time during the read out of the CCD it is also important to operate the detector while it is being read. Multiplexing devices have been proposed to perform this operation (Barber et al., 1993). Other readout devices such as resistive plate detectors and analog delay lines (Williams & Sobottka, 1994) may be used for speedy detection of the current produced by electrons but they require higher charge for operation and are not compatible with the CCD system.

Second, a large voltage must be applied across the CdZnTe crystal (100 to 1000 V) in order to quickly move the electrons to the surface during their free electron lifetime. Leakage current within this crystal has caused this large voltage to appear across the preamplifier and CCD readout system. This high voltage usually destroys the CCD readout system.

The concept of high gain amplification using photomultiplier tubes has been used extensively over the last 60 years. Unfortunately, the photomultiplier tubes, while they do have a large dynamic range in gain and can provide an amplification of $10^7$ cannot provide good position resolution for the location of the photon on the detector. The micro channel plate (MCP) is a device similar in concept to the photomultiplier tube, but which amplifies the electron charge by successive collision of the electrons with the walls of small conductive glass tubes. Since the electrons are confined to remain within the walls of the tubes, these devices provide a gain similar to a photomultiplier tube, yet preserve the position information. These devices were developed for night vision applications, where infrared photons are converted by a photocathode into electrons which are amplified by the micro channel plate and then converted by a phosphor to visible light. The position resolution of these devices is determined by the size of the glass tubes and can be tailored to fit the application. Currently, MCP devices can be built with a spatial resolution of 0.02 mm.

What is required is therefore a device or a method that would accurately measure the energy and position of high energy electromagnetic radiation and would eliminate the technological challenges necessitated by the CCD approach.

SUMMARY OF THE INVENTION

Generally speaking, the present invention provides a device and a method for measuring accurately the energy and position of high energy electromagnetic radiation emitted from radioactive material that may be administered to a patient in a medical diagnostic imaging system.

A device of the present invention for detecting high energy electromagnetic radiation largely solves the problems associated with known detection devices by providing unexpected improvements in spatial, time and energy resolution, and reading of the detectors in PET and SPECT system environment. The device of the present invention can achieve a position resolution that could become a tenth of a millimeter or less. The present invention provides a new approach that would provide the advantages of the much higher gain of a photomultiplier tube, and a spatial resolution comparable to prior art CCD systems. One of the goals of the present invention is to eliminate many of the technological challenges necessitated by the prior art CCD approach.

Another goal of the present invention is to eliminate the problem of leakage current associated with prior art devices using the combination of CdZnTe crystal and CCD readout system that requires large voltage to be applied across the crystal. In the present invention since the leakage current would only produce the standard photomultiplier dark current, it would have no deleterious effect on the device.

Another object of the invention is to reduce the complexity of the data acquisition system provided by readout devices. The high gain of the device of the present invention would allow use of a larger range of fast readout devices such as resistive plate detectors and analog delay lines. These devices provide an xy coordinate and a charge that is proportional to the energy of the incident radiation, in contrast to the CCD system, where all of the pixels must be read to obtain the charge from few active ones.

According to these and other objectives, the device of the present invention consists of an electromagnetic radiation detector for detecting high energy electromagnetic radiation emitted from radioactive material administered to a patient in a medical imaging system to produce an image of the patient, comprising a combination of CdZnTe crystal or plurality of such crystals positioned to receive and absorb electromagnetic radiation from the high energy electromagnetic radiation source and a plate comprising a plurality of micro channels, said plate is interfaced to the CdZnTe crystal for collecting and multiplying the electrons liberated from the CdZnTe crystal. This combination of CdZnTe crystal and MCP may be further combined with means for activating the CdZnTe crystal to facilitate the liberation of electrons from the crystal, readout means coupled to MCP for reading the charge produced by the multiplied electrons, means for accelerating electrons liberated from the rear crystal surface of the slab toward the plate, and means for accelerating multiplied electrons from said plate to the read out means. The readout means then reads the current produced by the multiplied electrons in a manner providing position of incident photons in the CdZnTe crystal. Such acceleration means for facilitating movement of the electrons may be an electric field or a voltage applied across the CdZnTe crystal and to MCP. The electromagnetic radiation detector may be placed in a vacuum envelop comprising a face plate that is placed in front of the front crystal surface of the slab.

Another device of the present invention focuses on the combination of a slab comprising a CdZnTe crystal or a plurality of such crystals and a MCP interfaced with each other. The combination of CdZnTe crystal and MCP making a position-sensitive electromagnetic radiation detector is for detecting high energy electromagnetic radiation emitted from any high energy electromagnetic radiation source, and for measuring accurately the position and energy of such radiation. This device may be coupled with readout means, activation means, or with the means for acceleration of electrons discussed above. This device may also be placed in a vacuum envelop comprising a face plate.

The method of the present invention for making the position-sensitive electromagnetic radiation detector comprises the steps of positioning a slab of cadmium zinc telluride crystal for receiving and absorbing high energy electromagnetic radiation from a source of high energy electromagnetic radiation, activating the rear crystal surface of the CdZnTe crystal, interfacing MCP to CdZnTe crystal, providing means for accelerating electrons liberated from the rear crystal surface of the slab toward the plate, coupling readout means to MCP, providing means for accelerating the electrons multiplied by MCP toward the readout means which reads the current produced by the electrons in a manner that provides the position of the incident photon in the CdZnTe crystal. The high energy electromagnetic radiation source may be a patient in a medical diagnostic imaging system to whom radioactive material is administered.

A method of making a position-sensitive electromagnetic radiation detector comprising a combination of MCP and CdZnTe crystal includes the steps of positioning a slab of cadmium zinc telluride crystal for receiving and absorbing high energy electromagnetic radiation from a source of high energy electromagnetic radiation, and interfacing MCP to the CdZnTe crystal. This method may also include the steps of activating the crystal, coupling readout means to MCP, and providing means for acceleration of electrons if the combination of CdZnTe crystal and MCP is further desired to be combined with other elements such as activation means, readout means and acceleration of electron means. A high energy electromagnetic radiation source may be, among other things, a patient in a medical imaging system to which radioactive material is administered.

The method of measuring the position and energy of high energy electromagnetic radiation emitted from radioactive material administered to a patient in a medical imaging system to produce an image of the patient, comprises the steps of providing a electromagnetic radiation detector, administering high energy radioactive material to a patient, positioning the detector proximate the patient for receiving the high energy radiation emitted from the radioactive material that is administered to a patient, and measuring the position and energy of incident photon in the crystal of said slab, using said readout means.

Another method of measuring the position and energy of high energy electromagnetic radiation emitted from a high energy electromagnetic radiation source comprises the steps of providing a high energy electromagnetic radiation detector, positioning said detector proximate to the source of high energy electromagnetic radiation, and measuring the energy and position of incident photon in the CdZnTe crystal using the readout means.

The electromagnetic radiation to be detected is preferably high energy X-rays or Gamma rays. The readout means used in the device are preferably analog delay lines or resistive plate detectors. The crystal to be used in the present invention is preferably CdZnTe crystal. The CdZnTe-MCP detector is preferably used in PET, SPECT, or X-ray medical imaging systems. The means for activating the CdZnTe crystal for facilitating liberation of electrons from its crystal surface is preferably a negative affinity device technique.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawing, fully described in the detailed description of the invention and particularly pointed out in the claims. However, such drawing and description disclose but one of the various ways in which the invention may be practiced.

BRIEF DESCRIPTION OF THE DRAWING

To enhance the understanding of the detailed description of the preferred embodiment below, reference may be had to the drawing in which.

DETAILED DESCRIPTION OF THE PREFERRED EMBODIMENT

Figure 1:
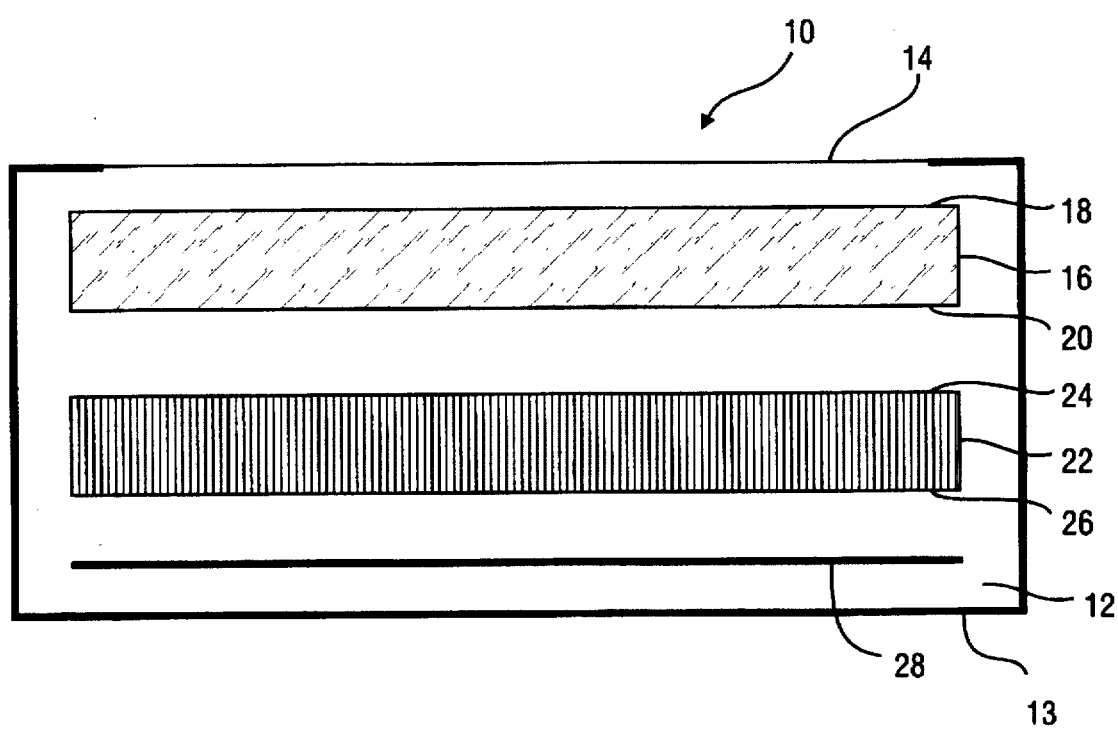
FIG. 1. is a schematic diagram of an electromagnetic radiation detector constructed according to the provisions of the present invention.

FIG. 1 depicts an electromagnetic radiation detector 10 enclosed in a vacuum envelop 12 contained in an enclosure 13 having a face plate 14. The electromagnetic radiation detector 10 so depicted includes a slab comprising a CdZnTe crystal 16 positioned for receiving and absorbing high energy electromagnetic radiation (incident radiation) from a source of high energy electromagnetic radiation (not shown). The CdZnTe crystal 16 has a front crystal surface 18 and a rear crystal surface 20, the face plate 14 is placed adjacent to the front crystal surface 18 of CdZnTe crystal 16. This front crystal surface 18 and the face plate 14 are positioned proximate to the source of electromagnetic radiation such that incident radiation (not shown) penetrates the face plate 14 and is absorbed by the CdZnTe crystal 16 which extracts the high energy of the incident radiation to convert the incident radiation (incident photons) into electrons (not shown) in its conduction band (not shown). A voltage (not shown) is applied between the front crystal surface 18 and the rear crystal surface 20 of the CdZnTe crystal 16 which is sufficient to cause the electrons that are produced in the CdZnTe crystal 16 to move in a direct path to the rear crystal surface 20. The rear crystal surface 20 is activated by means (not shown) known to those skilled in the art such that the activation facilitates liberation of electrons from the rear crystal surface 20 into a vacuum region created by the vacuum envelop 12 between the rear crystal surface 20 of the CdZnTe crystal 16 and the front surface 24 of a micro-channel plate (MCP) 22. This front surface 24 of MCP 22 is interfaced to the rear crystal surface 20 of the CdZnTe crystal 16 such that a voltage (not shown) applied to MCP 22 accelerates the electrons liberated from the rear crystal surface 20 of the CdZnTe crystal 16 toward the front surface 24 of MCP 22. The MCP 22 then multiplies the electrons accelerated toward its front surface 24 and these multiplied electrons (not shown) are then accelerated from the rear surface 26 of MCP 22 into a vacuum region created by the vacuum envelop 12 between the rear surface 26 of MCP 22 and readout means 28. An electric field applied to readout means 28 accelerates the multiplied electrons from rear surface 26 of MCP 22 to readout means 28. The readout means 28 detects the multiplied electrons and reads the current produced by these multiplied electrons in a manner providing the position of the incident photon in the CdZnTe crystal 16.

The position-sensitive electromagnetic detector 10 described herein is not limited to the detection of X-rays and Gamma rays although these type of radiations are preferred, but can be also used to detect any type of electromagnetic radiation that can be intercepted and absorbed by CdZnTe crystal to directly convert incident photons into electrons. The CdZnTe crystal is known to be capable of absorbing visible light down the electromagnetic spectrum into the yellow color (~6200 A). Also, though the electromagnetic radiation detector of the present invention is useful for any detection of electromagnetic radiation whether in astronomy or medical area or other related scientific fields, its greatest potential is in medical applications such as PET, SPECT, X-rays and CatScan.

The present invention is also not limited to using CdZnTe crystals only, other crystals such as gallium arsenide crystal may also be used such that incident high energy radiation when absorbed is converted into electrons by such crystals.

When the electromagnetic radiation detector of the present invention is used in applications other than medical imaging system applications such as the field of astronomy, the high energy electromagnetic radiation source could be any object through which such radiation is passed or which emits such radiation.

The electromagnetic radiation detector of the present invention can also be constructed just from the combination of the CdZnTe crystal or crystals and a micro channel plate, such combination may or may not be coupled with activation means, readout means or means for acceleration of electrons.

The device of the present invention may be used to detect low energy electromagnetic radiation (energy less than 10 keV); however, it is optimal for absorbing high energy electromagnetic radiation, for example, X-rays of energy greater than 10 keV and Gamma rays up to 1 Mev. Currently, medical applications work with Gamma's less than 512 keV. Since the thickness of the CdZnTe crystal is a function of the electromagnetic radiation to be detected, the energy of the incident radiation should be of such order as would enable the electrons produced in the CdZnTe crystal to be drawn out in the vacuum.

Similarly the configuration of the CdZnTe crystal such as its size and thickness is dependant on the electromagnetic radiation to be detected. For example, the optimal detector for X-rays would be a thin crystal (less than 1 mm) while the optimum detector for a PET system may be greater than 1 cm. The optimization of the crystal thickness requires the proper matching of two competing processes. A thicker crystal has a better efficiency for stopping incident electromagnetic radiation but less probability that all of the generated charge will be collected at the surface, since some of the electrons may recombine with the defects in the crystal. Currently, crystals can be purchased off the shelf at a size of 1.5×1.5×0.5 cm. Face areas up to 5 cm can be constructed. The size of the crystals typically on the order of 1 to 5 cm rectangles is optimized for the application of the invention which is consistent with the available sizes of the crystal.

The present invention does not require more than one crystal to be interfaced with the micro channel plate for its proper operation. However, the number of the crystals desired is primarily determined by the size of the detector and the size of the crystals that can be grown.

The voltage that is required to be applied across the CdZnTe crystal is a function of the crystal thickness and will range from 500 to 2000 volts per centimeter of the thickness of the crystal so as to be sufficient to cause the electrons to move in a direct path to the rear crystal surface of CdZnTe crystal. The voltage applied to MCP is relative to this voltage across CdZnTe crystal, such that electrons liberated from the rear crystal surface of CdZnTe crystal are accelerated toward MCP.

The surface of the CdZnTe crystal may be activated in any fashion known to those skilled in the art that will achieve the best work function for the emission of electrons into the vacuum envelop. One of the preferable ways of activating the rear crystal surface of the CdZnTe crystal is to make it a negative affinity device by techniques know to those skilled in the art. An adequate electric field across the CdZnTe crystal to cause the electrons to travel in the proper direction may be created by depositing a metallic coating on the front surface of the crystal and a conductive coating or crystal dopant on the rear surface of the crystal. The optimization of the conductivity and work function of the rear crystal surface coating is important for the operation of the device. In particular, the resistivity preferably should be low enough to provide a uniform electric field across the crystal, and yet high enough to force the electronic charge to cross the vacuum to the micro-channel plate rather than travel down the conductive coating. The work function should also be as low as possible to facilitate the liberation of the electron in the vacuum. Software modelling may be performed to optimize these parameters. A technology which would significantly reduce the work function would be the use of thin-film emission cathodes. The present invention may use these devices as an alternative way of activating the CdZnTe crystal. The use of such micro field emission devices for the activation of crystals in an electromagnetic radiation detector allows the present invention to be not limited to just the CdZnTe crystal but other crystals such as gallium arsenide may also be used such that the micro field emission devices when deposited on their crystal surface activates the surface and facilitates the liberation of the electrons from the crystal surface.

The electromagnetic radiation detector of the present invention may be enclosed in a vacuum envelop or such vacuum regions between the components may be created in any other fashion such that the vacuum region so created facilitates the transfer of electrons from one component to the other as described above.

The micro channel plate in the present invention is typically placed about ¼ mm from the CdZnTe crystal such that the front surface of the MCP interfaces with the rear crystal surface of the CdZnTe crystal. The voltage on the surface of the MCP is relative to the voltage across CdZnTe crystal, such that it is sufficient to draw the electrons from the rear crystal surface of CdZnTe crystal, through the vacuum between front surface of MCP and rear crystal surface of CdZnTe crystal, to the front surface of MCP. The position resolution of the detector will be a direct function of the size of the micro channels of MCP, the number of channels in the MCP is optimized by the channel plate designer to pack the largest number of the channels of a given cross sectional area onto the plate. Currently, MCP devices can be built with a spatial resolution of 0.02 ram. The resolution will be application specific, and will range from 1 mm diameter (for PET) down to the minimum size that can be fabricated. The position resolution that can be achieved by the present invention is a tenth of a millimeter or less.

The readout means that may be used in the present invention must have a speed comparable to that of the frequency of the electromagnetic radiation incident on the CdZnTe crystal. The readout means in the present invention is typically placed about ¼ mm from the MCP. Readout devices such as resistive plates detectors and analog delay lines may be purchased from companies such as Science Applications International Corporation situated in San Diego, Calif. These read out devices provide an xy coordinate and a charge that is proportional to the energy of the incident electromagnetic radiation. In traditional devices that use pixel such as charge coupled devices, as one increases the area of coverage or the size of the detector the number of the pixels has to be increased in the CCD readout system, but since the high gain of the present invention allows the detector of the present invention to be coupled to a larger range of fast readout systems, a single readout system can handle a large CdZnTe crystal.

The components of the present invention that are preferably enclosed in a vacuum envelop can be so enclosed in any known fashion. Electrical communication, whenever required between the components of the present invention, may be accomplished in any known fashion.

REFERENCES

The following references, to the extent that they provide exemplary procedural or other details supplementary to those set forth herein, are specifically incorporated herein by reference.

Antich et al., "Position-sensitive Gamma Ray Detector," U.S. Pat. No. 5,281,821, 1994.

Barber et al., "A Gamma-Ray Imager with Multiplexer Read-Out for use in Ultra-High-Resolution Brain SPECT," *IEEE Trans. Nucl. Sci.*, NS-40:1104–1106, 1993.

Butler et al., "CdZnTe Gamma Ray Detectors," *IEEE Trans. on Nucl. Science*, 39:605–609, 1992.

Chaney et al., "Method and Apparatus for Determining and Utilizing Cross-Talk Adjusted Scintillating Fibers," U.S. Pat. No. 5,374,824, 1994.

Derbyshire, "Beyond AMLCDs: Field emission displays?" *Solid State Technology*, pp. 55–65, November, 1994.

Doty et al., "Pixellated CdZnTe detector arrays," *Nucl. Inst. and Methods*, A353:356–360, 1994.

Gordon et al., "Work function and photoemission studies of cesium-coated CdTe(100)," *The American Physical Society*, 49(7):4898–4891, 1994.

Lumb & Nousek, "Energy Response of Astronomical CCD X-ray detectors," *SPIE*, 1736:138–148, 1992.

Nelson et al., "Testing of a Scintillating Fiber PET System," *SPIE*, 2007:132–136, 1993.

Spindt et al., U.S. Pat. No. 3,755,704, 1973a.

Spindt et al., U.S. Pat. No. 3,789,741, 1973b.

Spindt et al., U.S. Pat. No. 3,812,559, 1974.

Williams & Sobottka, "Progress toward a 92 mm diameter MCP phototube with helical delay line readout," *SPIE*, 2278:248–256, 1994.

What is claimed is:

1. A position-sensitive electromagnetic radiation detector being enclosed in a vacuum envelope, for detecting radiation from a high energy electromagnetic radiation source administered to a patient in a medical diagnostic imaging system to produce an image of the patient, comprising:

(a) a slab comprising a cadmium zinc telluride crystal positioned for absorbing incident high energy electromagnetic radiation emitted from a high energy electromagnetic radiation source administered to a patient, for extracting the high energy of incident radiation and producing electrons in a conduction band of the crystal, said slab having a front crystal surface and a rear crystal surface, the front crystal surface being proximate to the source of emitted radiation;

(b) readout means having a speed comparable to that of the frequency of incident radiation;

(c) a plate comprising a plurality of position-sensitive micro channels disposed between said read out means and said slab, said plate having a front surface and a rear surface, the front surface of said plate being interfaced to the rear crystal surface of said slab, and said plate being coupled to the read out means;

(d) means for activating the rear crystal surface of said slab to facilitate liberation of electrons from said rear crystal surface;

(e) means for accelerating electrons liberated from the rear crystal surface of said slab toward said plate, wherein such electrons are multiplied by said micro channels; and (f) means for accelerating multiplied electrons from said plate toward said readout means, wherein current produced by multiplied electrons is read in a manner providing position of incident photons in the crystal of said slab.

2. A position-sensitive electromagnetic radiation detector for detecting radiation from a high energy electromagnetic radiation source, comprising:

(a) a slab comprising a cadmium zinc telluride crystal positioned for absorbing incident high energy electromagnetic radiation emitted from a high energy electromagnetic radiation source for extracting high energy of incident radiation and producing electrons in a conduction band of the crystal, said slab having a front crystal surface and a rear crystal surface, the front crystal surface being proximate to the source of emitted radiation; and (b) a plate comprising a plurality of position-sensitive micro channels, said plate having a front surface and a rear surface, the front surface of said plate being interfaced to the rear crystal surface of said slab.

3. The position-sensitive electromagnetic radiation detector of claim 2 further defined as being enclosed in a vacuum envelope and comprising a face plate placed before the front crystal surface of said slab.

4. The position-sensitive electromagnetic radiation detector of claim 1 wherein said vacuum envelope is contained by an enclosure having a face plate placed before the front crystal surface of said slab.

5. The position-sensitive electromagnetic radiation detector of claim 1 wherein the medical diagnostic imaging system is single photon emission tomography.

6. The position-sensitive electromagnetic radiation detector of claim 1 wherein the medical diagnostic imaging system is positron emission tomography.

7. The position-sensitive electromagnetic radiation detector of claim 1 wherein the medical diagnostic imaging system is an X-ray system.

8. The position-sensitive electromagnetic radiation detector of claim 1 or claim 2 wherein the slab conprises a plurality of cadmium zinc telluride crystals.

9. The position-sensitive electromagnetic radiation detector of claim 1 or claim 2 wherein the high energy electromagnetic radiation source is a high energy gamma-ray radiation source.

10. The position-sensitive electromagnetic radiation detector of claim 1 or claim 2 wherein the high energy electromagnetic radiation source is a high energy X-ray radiation source.

11. The position-sensitive electromagnetic radiation detector of claim 1 or claim 2 wherein the slab comprising a cadmium zinc telluride crystal has a voltage applied between the front crystal surface and the rear crystal surface of said slab, the voltage being sufficient to cause electrons produced in a conduction band of the crystal of said slab to move in a direct path to the rear crystal surface of said slab.

12. The position-sensitive electromagnetic radiation detector of claim 1 wherein said means for accelerating liberated electrons toward said plate is a voltage applied to said plate.

13. The position-sensitive electromagnetic radiation detector of claim 1 wherein the readout means is a resistive plate detector.

14. The position-sensitive electromagnetic radiation detector of claim 1 wherein the readout means is an analog delay line.

15. The position-sensitive electromagnetic radiation detector of claim 1 wherein the means for activating the rear crystal surface of said slab is a negative affinity device technique.

16. The position-sensitive electromagnetic radiation detector of claim 2 wherein the high energy electromagnetic radiation source is a high energy electromagnetic radiation source administered to a patient in a medical diagnostic imaging system to produce an image of the patient.

17. The position-sensitive electromagnetic radiation detector of claim 16 wherein the medical diagnostic imaging system is a single photon emission tomography system, a positron emission tomography system, or an X-ray system.

18. The position-sensitive electromagnetic radiation detector of claim 2 further defined as having means for activating the rear crystal surface of said slab to facilitate liberation of electrons from said rear crystal surface.

19. The position-sensitive electromagnetic radiation detector of claim 18 wherein the means for activating the rear crystal surface of said slab is a negative affinity device technique.

20. The position sensitive electromagnetic radiation detector of claim 2 further defined as having readout means having a speed comparable to that of the frequency of incident radiation, said readout means being coupled to said plate.

21. The position-sensitive electromagnetic radiation detector of claim 20 wherein the readout means is a resistive plate detector.

22. The position-sensitive electromagnetic radiation detector of claim 20 wherein the readout means is an analog delay line.

23. The position-sensitive electromagnetic radiation detector of claim 2 or claim 18 further defined as comprising means for accelerating electrons liberated from the rear crystal surface of said slab toward said plate, wherein such electrons are multiplied by said micro channels.

24. The position sensitive electromagnetic radiation detector of claim 23 further defined as having means for accelerating multiplied electrons to said readout means, wherein current produced by multiplied electrons is read in a manner providing position of incident photons in the crystal of said slab.

25. The position-sensitive electromagnetic radiation detector of claim 23 wherein said means for accelerating liberated electrons toward said plate is a voltage applied to said plate.

26. The position sensitive electromagnetic radiation detector of claim 24 wherein said means for accelerating multiplied electrons to said readout means is an electric field.

27. A method of making a position-sensitive electromagnetic radiation detector being enclosed in a vacuum envelope, said method comprising the steps of:

(a) positioning a slab comprising a cadmium zinc telluride crystal for absorbing incident high energy electromagnetic radiation emitted from a high energy electromagnetic radiation source for extracting high energy of incident radiation to produce electrons in a conduction band of the crystal, said slab having a front crystal surface and a rear crystal surface, the front crystal surface being proximate to source of emitted radiation;

(b) interfacing a plate comprising a plurality of micro channels to said slab, said plate having a front surface and a rear surface, the front surface of said plate being interfaced with the rear crystal surface of said slab;

(c) activating the rear crystal surface of said slab to facilitate the liberation of electrons from the rear crystal surface of said slab;

(d) coupling read out means having a speed comparable to that of frequency of the incident radiation;

(e) providing means for accelerating electrons liberated from the rear crystal surface of said slab toward said plate, wherein such electrons are multiplied by said micro channels; and (f) providing means for accelerating multiplied electrons from said plate toward said readout means, wherein current produced by multiplied electrons is read in a manner providing position of incident photons in the crystal of said slab.

28. The method of making a position-sensitive electromagnetic radiation detector of claim 27 wherein said vacuum envelope is a vacuum envelope having a face plate placed in front of the front crystal surface of said plate.

29. The method of making a position-sensitive electromagnetic radiation detector of claim 27 wherein said slab comprises:

a plurality of cadmium zinc telluride crystals.

30. The method of making a position-sensitive electromagnetic radiation detector of claim 27 wherein the high energy electromagnetic radiation is high energy gamma-ray radiation.

31. The method of making a position-sensitive electromagnetic radiation detector of claim 27 wherein the high energy electromagnetic radiation is high energy X-ray radiation.

32. The method of making a position-sensitive electromagnetic radiation detector of claim 27 wherein said slab has a voltage applied between the front crystal surface and the rear crystal surface of said slab, the voltage being sufficient to cause electrons produced in a conduction band of the crystal of said slab to move in a direct path to the rear crystal surface of said slab.

33. The method of making a position-sensitive electromagnetic radiation detector of claim 27 wherein said providing the means to accelerate electrons liberated from the rear crystal surface of said slab step comprises:

applying a voltage to said plate.

34. The method of making a position-sensitive electromagnetic radiation detector of claim 27 wherein providing the means for accelerating multiplied electrons form said plate to said readout means step comprises:

providing an electric field.

35. The method of making a position-sensitive electromagnetic radiation detector of claim 27 wherein said readout means is a resistive plate detector.

36. The method of making a position-sensitive electromagnetic radiation detector of claim 27 wherein said readout means is an analog delay line.

37. The method of making a position-sensitive electromagnetic radiation detector of claim 27 wherein the activating the rear crystal surface of said slab step comprises:

providing a negative affinity device technique.

38. A method of making a position-sensitive electromagnetic radiation detector being enclosed in a vacuum envelope, said method comprising the steps of:

(a) positioning a slab comprising a cadmium zinc telluride crystal for absorbing incident high energy electromagnetic radiation emitted from a high energy electromagnetic radiation source for extracting high energy of incident radiation to produce electrons in a conduction band of the crystal, said slab having a front crystal surface and a rear crystal surface, the front crystal surface being proximate to the source of emitted radiation;

(b) interfacing a plate comprising a plurality of micro channels.

39. The method of making a position-sensitive electromagnetic radiation detector of claim 38 wherein said vacuum envelope is contained by an enclosure having a face plate placed before the front crystal surface of said plate.

40. The method of making a position-sensitive electromagnetic radiation detector of claim 38 wherein said slab comprises:

a plurality of cadmium zinc telluride crystals.

41. The method of making a position-sensitive electromagnetic radiation detector of claim 38 wherein the high energy electromagnetic radiation is high energy gamma radiation.

42. The method of making a position-sensitive electromagnetic radiation detector of claim 38 wherein the high energy electromagnetic radiation is high energy X-radiation.

43. The method of making a position-sensitive electromagnetic radiation detector of claim 38 wherein said slab has a voltage applied between the front crystal surface and the rear crystal surface of said slab, the voltage being sufficient to cause electrons produced in a conduction band of the crystal of said slab to move in a direct path to the rear crystal surface of said slab.

44. The method of making a position-sensitive electromagnetic radiation detector of claim 38 further comprising the step of:

activating the rear crystal surface of said slab to facilitate the liberation of electrons from rear the rear crystal surface of said slab.

45. The method of making a position-sensitive electromagnetic radiation detector of claim 44 wherein said activating step comprises:

providing a negative affinity device technique.

46. The method of claim 38 or claim 45 further comprising step of:

providing means for accelerating electrons liberated from the rear crystal surface of said slab toward said plate, wherein such electrons are multiplied by said micro channels.

47. The method of claim 46 wherein providing the means for accelerating step comprises:

applying a voltage to said plate.

48. The method of claim 38 further defined as comprising steps of coupling readout-means having frequency of incident radiation to said plate.

49. The method of claim 48 wherein said readout means is resistive plate detector.

50. The method of claim 48 wherein said readout means is analog delay line.

51. The method of claim 48 further comprising the step of providing means for accelerating multiplied electrons from said plate to said readout means, wherein the current produced by said multiplied electrons is read in a manner providing position of incident photons in the crystal of said slab.

52. The method of claim 51 wherein said step of providing means for accelerating multiplied electrons is an electric field.

53. A method of measuring a position and energy of high energy electromagnetic radiation emitted from radioactive material administered to a patient in a medical diagnostic imaging system to produce an image of the patient, said method comprising the steps of:

(a) providing a position-sensitive electromagnetic radiation detector being enclosed in a vacuum envelope having a face plate, comprising:

i. a slab comprising a cadmium zinc telluride crystal, said crystal being activated;

ii. a plate comprising a plurality of micro channels interfaced to said slab, such that incident photons, when absorbed and converted into electrons by a crystal of said slab, said electrons are accelerated toward said plate, wherein said micro channels multiply the electrons;

iii. readout means coupled to said plate, such that, multiplied electrons are accelerated from said plate toward said readout means, said readout means read current produced by multiplied electrons in a manner providing the position of incident photons in the crystal of said slab;

(b) administering high energy radioactive material to a patient in a medical diagnostic imaging system to produce an image of the patient;

(c) positioning said position-sensitive detector proximate said patient, to receive the high energy electromagnetic radiation emitted from said radioactive material administered to the patient; and (d) measuring the position and energy of incident photons in the crystal of said slab, using said readout means.

54. The method of claim 53 wherein the medical diagnostic imaging system is a Single Photon Emission Tomography system, a positron emission tomography system, or a X-ray system.

55. The method of claim 53 wherein the slab comprises a plurality of cadmium zinc telluride crystals.

56. The method of claim 53 wherein the high energy electromagnetic radiation is high energy gamma radiation.

57. The method of claim 53 wherein the high energy electromagnetic radiation is high energy X-radiation.

* * * * *

UNITED STATES PATENT AND TRADEMARK OFFICE
CERTIFICATE OF CORRECTION

PATENT NO.    :   5, 719,401

DATED         :   February 17, 1998

INVENTOR(S)   :   Chaney *et al.*

It is certified that error appears in the above-identified patent and that said Letters Patent is hereby corrected as shown below:

In claim 34, column 12, line 36, please delete "form" and insert -- from -- therefor.

Signed and Sealed this

Twenty-sixth Day of May, 1998

Attest:

BRUCE LEHMAN

*Attesting Officer*        *Commissioner of Patents and Trademarks*